(12) United States Patent
Zhang

(10) Patent No.: US 11,997,152 B2
(45) Date of Patent: May 28, 2024

(54) METHOD, USER TERMINAL, NETWORK NODE, AND SYSTEM FOR CONTROLLING TRANSMISSION OF MEDIA STREAM SERVICE, STORAGE MEDIUM, AND ELECTRONIC DEVICE

(71) Applicant: TENCENT TECHNOLOGY (SHENZHEN) COMPANY LIMITED, Guangdong (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/979,331

(22) Filed: Nov. 2, 2022

(65) Prior Publication Data

US 2023/0060976 A1 Mar. 2, 2023

Related U.S. Application Data

(63) Continuation of application No. PCT/CN2021/119206, filed on Sep. 18, 2021.

(51) Int. Cl.
*G06F 15/16* (2006.01)
*H04L 65/1069* (2022.01)
(Continued)

(52) U.S. Cl.
CPC .......... *H04L 65/61* (2022.05); *H04L 65/1069* (2013.01); *H04L 65/80* (2013.01)

(58) Field of Classification Search
CPC ...... H04L 65/61; H04L 65/1069; H04L 65/80
See application file for complete search history.

(56) References Cited

U.S. PATENT DOCUMENTS

2020/0137675 A1* 4/2020 Park .................... H04W 68/005
2020/0178048 A1* 6/2020 Kim ..................... H04W 12/062
(Continued)

FOREIGN PATENT DOCUMENTS

CN 108011899 A 5/2018
CN 109286567 A 1/2019
(Continued)

OTHER PUBLICATIONS

3GPP 5G, System architecture for the 5G System (5GS) (3GPP TS 23.501 version 16.6.0 Release 16), ETSI TS, May 31, 2020 (Year: 2020).*

(Continued)

*Primary Examiner* — Oleg Survillo
(74) *Attorney, Agent, or Firm* — Sughrue Mion, PLLC

(57) ABSTRACT

Example embodiments provide a method, a user terminal, a network node in a data network, and a network node in a core network for controlling transmission of a media stream service. The method includes: receiving, from a network node in a data network, policy template information including a continuity feature of at least one media stream service; determining, based on a media stream service and the policy template information, a continuity feature of the media stream service; determining whether a protocol data unit (PDU) session capable of carrying the media stream service exists; binding the media stream service to a PDU session including the continuity feature of the media stream service, based on determining that the PDU session exists; and establishing a PDU session including the continuity feature of the media stream service, based on determining that the PDU session does not exist.

9 Claims, 5 Drawing Sheets

(51) Int. Cl.
*H04L 65/61* (2022.01)
*H04L 65/80* (2022.01)

(56) References Cited

U.S. PATENT DOCUMENTS

| 2020/0275302 | A1* | 8/2020 | Youn | H04W 28/0268 |
| 2023/0050848 | A1* | 2/2023 | Zhang | H04L 65/1069 |
| 2023/0068189 | A1* | 3/2023 | Xu | H04W 40/34 |

FOREIGN PATENT DOCUMENTS

| CN | 109842643 A | 6/2019 |
| CN | 112202787 A | 1/2021 |
| CN | 112217812 A | 1/2021 |
| EP | 3 703 339 A1 | 9/2020 |
| JP | 2022-506624 A | 1/2022 |
| WO | 2020/063914 A1 | 4/2020 |

OTHER PUBLICATIONS

Huawei et al. "SMF actions on rejection of PDU Session session or QoS flows during Handover and Service Request procedures", 3GPP TSG-SA WG2 Meeting #132, S2-1904581, Apr. 8-12, 2019, Xi'an, China, 25 pages.
Written Opinion for PCT/CN2021/119206, dated Nov. 25, 2021.
International Search Report for PCT/CN2021/119206, dated Nov. 25, 2021.
Extended European Search Report dated Sep. 6, 2023 in European Application No. 21874280.7.
"Network Assistance for Traffic Handling in Downlinnk Streaming," Qualcomm Inc., TSG SA4#100 Meeting, Oct. 1-1, 2019, Tdoc S419 (14 Pages total).
"Consolidated changes from SA4#108-e and SA4#109-e," 3GPP TSG-SA WG4 Meeting #109-e, May 20-Jun. 3, 2020, S4-200882 (16 pages total).

* cited by examiner

METHOD, USER TERMINAL, NETWORK NODE, AND SYSTEM FOR CONTROLLING TRANSMISSION OF MEDIA STREAM SERVICE, STORAGE MEDIUM, AND ELECTRONIC DEVICE

CROSS-REFERENCE TO RELATED APPLICATION(S)

This application is a bypass continuation application of International Application No. PCT/CN2021/119206, filed Sep. 18, 2021, which claims priority to Chinese Patent Application No. 202011064131.8, filed on Sep. 30, 2020 with the China National Intellectual Property Administration, the disclosures of which are herein incorporated in their entireties.

FIELD

The disclosure relates to the field of wireless communications, and in particular, to a method for controlling transmission of a media stream service, a user terminal, a network node in a data network, and a network node in a core network for controlling transmission of a media stream service, a system for controlling transmission of a media stream service, a non-volatile computer-readable storage medium, and an electronic device.

BACKGROUND

Compared with the conventional communication systems, the 5G system provides many new features, such as mobile broadband connection with high bit rates and low latency, network slicing, and distributed and mobile edge computing, which can improve the quality and efficiency of audio and video stream services, and can provide new services (for example, virtual reality and mixed reality) beyond the conventional 2D video. This provides new opportunities both technically and commercially.

Currently, the 5G media streaming architecture (5GMSA) offers a simpler and modular design that enables third-party content service providers, broadcasters, and mobile network operators to collaborate to varying degrees. The focus is on leveraging the concept of capability exposure to provide external service providers with a simple manner of interacting with the 5G network and device functions, and use the functions provided by 5G to provide better media services.

In the current third generation partnership project technical specification (3GPP TS), a 5G media streaming system (5GMS) is provided for the transmission of media streams. The 5GMS system is a collection of application functions, application servers, terminal devices, and interfaces of the 5G media streaming architecture, which supports downstream media stream services or upstream media stream services, or both. Different continuity modes are set for protocol data unit (PDU) sessions to provide different continuity to different PDU sessions.

However, the control of transmission of media streams and data streams by the current 5GMS system is still not fine-tuned enough. For example, a network side device of the current 5GMS system cannot distinguish a plurality of pieces of media stream service data with the same IP address and port number. Moreover, in an interaction process between a network side device and an application server of the current 5GMS system, the continuity requirements of different types of media stream services are not considered. Therefore, the interaction and negotiation of the service continuity requirements cannot be realized.

SUMMARY

To overcome defects existing in the conventional technologies, the disclosure provides a method for controlling transmission of a media stream service performed by a user terminal, a method for controlling transmission of a media stream service performed by a network node in a data network, a method for controlling transmission of a media stream service performed by a network node in a core network, a method for controlling transmission of a media stream service and an electronic device, a user terminal, a network node, a system, and a non-volatile computer-readable storage medium corresponding thereto.

An embodiment of the disclosure provides a method for controlling transmission of a media stream service. The method includes: receiving, from a network node in a data network, policy template information for controlling transmission of at least one media stream service, the policy template information including a continuity feature of the at least one media stream service; determining, based on a media stream service and the policy template information, a continuity feature of the media stream service; determining whether a protocol data unit (PDU) session capable of carrying the media stream service exists, the PDU session comprising the continuity feature of the media stream service; binding the media stream service to the PDU session based on a determination that the PDU session exists; and establishing, based on a determination that the PDU session does not exist, a PDU session comprising the continuity feature of the media stream service.

An embodiment of the disclosure provides a method for controlling transmission of a media stream service. The method includes: transmitting, to a network node in a core network, a continuity requirement of at least one media stream service; receiving, from the network node in the core network, a continuity feature of the at least one media stream service; determining policy template information for controlling transmission of the at least one media stream service, the policy template information including the continuity feature of the at least one media stream service; and transmitting, to a user terminal, the policy template information for controlling transmission of the at least one media stream service.

An embodiment of the disclosure provides a method for controlling transmission of a media stream service performed by a network node in a core network. The method includes: receiving, from a network node in a data network a continuity requirement of at least one media stream service; determining a continuity feature of the at least one media stream service based on the continuity requirement of the at least one media stream service; and transmitting, to the network node in the data network, the continuity feature of the at least one media stream service.

An embodiment of the disclosure provides a method for controlling transmission of a media stream service. The method includes: transmitting, by a network node in a data network, a continuity requirement of at least one media stream service to a network node in a core network; determining, by the network node in the core network, a continuity feature of the at least one media stream service based on the continuity requirement of the a media stream service; transmitting, by the network node in the core network, the continuity feature of the at least one media stream service to the network node in the data network; determining, by the network node in the data network, policy template information for controlling transmission of the at least one media stream service, the policy template information including the continuity feature of the at least one media stream service; transmitting, by the network node in the data network, the policy template information for controlling transmission of the at least one media stream service to a user terminal; determining, by the user terminal based on a media stream service and the policy template information, a continuity feature of the media stream service; determining, by the user terminal, whether a protocol data unit (PDU) session capable of carrying the media stream service exists, the PDU session including the continuity feature of the media stream service; binding, by the user terminal, the media stream service to the PDU session based on a determination that the PDU session exists; and establishing, by the user terminal based on a determination that the PDU session does not exist, a PDU session including the continuity feature of the media stream service.

An embodiment of the disclosure provides a non-volatile computer-readable storage medium, storing computer instructions, the computer instructions, when executed by a processor, implementing the following method.

According to another aspect of the disclosure, a computer program product or a computer program is provided, the computer program product or the computer program including computer instructions, the computer instructions being stored in a non-volatile computer-readable storage medium. A processor of a computer device reads the computer instructions from the computer-readable storage medium, and executes the computer instructions, so that the computer device performs the method provided in the foregoing aspects or the optional implementations in the foregoing aspects.

An embodiment of the disclosure provides an electronic device, including: a processor; and a memory, storing a computer executable program, the processor, when executing the computer executable program, performing the foregoing method.

An embodiment of the disclosure provides a user terminal for controlling transmission of a media stream service. The user terminal includes: a memory; and one or more processors, operably coupled to the memory, the memory and the one or more processors being configured to: receive, from a network node in a data network, policy template information for controlling transmission of at least one media stream service, the policy template information including a continuity feature of the at least one media stream service; determine, based on a media stream service and the policy template information, a continuity feature of the media stream service; determine whether a protocol data unit (PDU) session capable of carrying the media stream service exists, the PDU session including the continuity feature of the media stream service; bind the media stream service to the PDU session based on a determination that the PDU session exists; and establish, based on a determination that the PDU session does not exist, a PDU session including the continuity feature of the media stream service.

An embodiment of the disclosure provides a user terminal for controlling transmission of a media stream service. The user terminal includes: a receiving unit, configured to receive, from a network node in a data network, policy template information for controlling transmission of at least one media stream service, the policy template information including a continuity feature of the at least one media stream service; a first determining unit, configured to determine, based on a media stream service and the policy template information, a continuity feature of the media stream service; a second determining unit, configured to determine whether a protocol data unit (PDU) session capable of carrying the media stream service exists, the PDU session including the continuity feature of the media stream service; and a session unit, configured to bind the media stream service to the PDU session based on a determination that the PDU session exists; and establish, based on a determination that the PDU session does not exist, a PDU session including the continuity feature of the media stream service.

An embodiment of the disclosure provides a network node in a data network for controlling transmission of a media stream service. The network node in the data network includes: a memory; and one or more processors, operably coupled to the memory, the memory and the one or more processors being configured to: transmit a continuity requirement of at least one media stream service to a network node in a core network; receive a continuity feature of the at least one media stream service from the network node in the core network; determine policy template information for controlling transmission of the at least one media stream service, the policy template information including the continuity feature of the at least one media stream service; and transmit the policy template information for controlling transmission of the at least one media stream service to a user terminal.

An embodiment of the disclosure provides a network node in a data network for controlling transmission of a media stream service. The network node in the data network includes: a first transmission unit, configured to transmit a continuity requirement of at least one media stream service to a network node in a core network; a receiving unit, configured to receive a continuity feature of the at least one media stream service from the network node in the core network; a determining unit, configured to determine policy template information for controlling transmission of the at least one media stream service, the policy template information including the continuity feature of the at least one media stream service; and a second transmission unit, configured to transmit the policy template information for controlling transmission of the at least one media stream service to a user terminal.

An embodiment of the disclosure provides a network node in a core network for controlling transmission of a media stream service, including: a memory; and one or more processors, operably coupled to the memory, the memory and the one or more processors being configured to: receive a continuity requirement of at least one media stream service from a network node in a data network; determine a continuity feature of the at least one media stream service based on the continuity requirement of the at least one media stream service; and transmit the continuity feature of the at least one media stream service to the network node in the data network.

An embodiment of the disclosure provides a network node in a core network for controlling transmission of a media stream service, including: a receiving unit, configured to receive a continuity requirement of at least one media stream service from a network node in a data network; a determining unit, configured to determine a continuity feature of the at least one media stream service based on the continuity requirement of the at least one media stream service; and a transmission unit, configured to transmit the continuity feature of the at least one media stream service to the network node in the data network.

An embodiment of the disclosure provides a system for controlling transmission of a media stream service, including a user terminal, a network node in a data network, and a network node in a core network, the network node in the data network being configured to: transmit a continuity requirement of at least one media stream service to the network node in the core network; receive a continuity feature of the at least one media stream service from the network node in the core network; determine policy template information for controlling transmission of the at least one media stream service, the policy template information including the continuity feature of the at least one media stream service; and transmit the policy template information for controlling transmission of the at least one media stream service to the user terminal; the network node in the core network being configured to: receive a continuity requirement of at least one media stream service from the network node in the data network; determine a continuity feature of the at least one media stream service based on the continuity requirement of the at least one media stream service; and transmit the continuity feature of the at least one media stream service to the network node in the data network; and the user terminal being configured to: receive, from the network node in the data network, policy template information for controlling transmission of the at least one media stream service, the policy template information including a continuity feature of the at least one media stream service; determine, based on a media stream service and the policy template information, a continuity feature of the media stream service; determine whether a protocol data unit (PDU) session capable of carrying the media stream service exists, the PDU session including the continuity feature of the media stream service; bind the media stream service to the PDU session based on a determination that the PDU session exists; and establish, in a case that the PDU session does not exist, a PDU session including the continuity feature of the media stream service.

BRIEF DESCRIPTION OF THE DRAWINGS

Through a more detailed description of embodiments of the disclosure in combination with the accompanying drawings, the above and other objectives, features and advantages of the disclosure are more obvious. The accompanying drawings are used to provide further understanding of the embodiments of the disclosure, and constitute a part of the specification, which are used to explain the disclosure in combination with the embodiments of the disclosure, and do not constitute a limitation to the disclosure. In the drawings, the same reference numerals generally represent the same components or steps.

DETAILED DESCRIPTION

Figure 1:
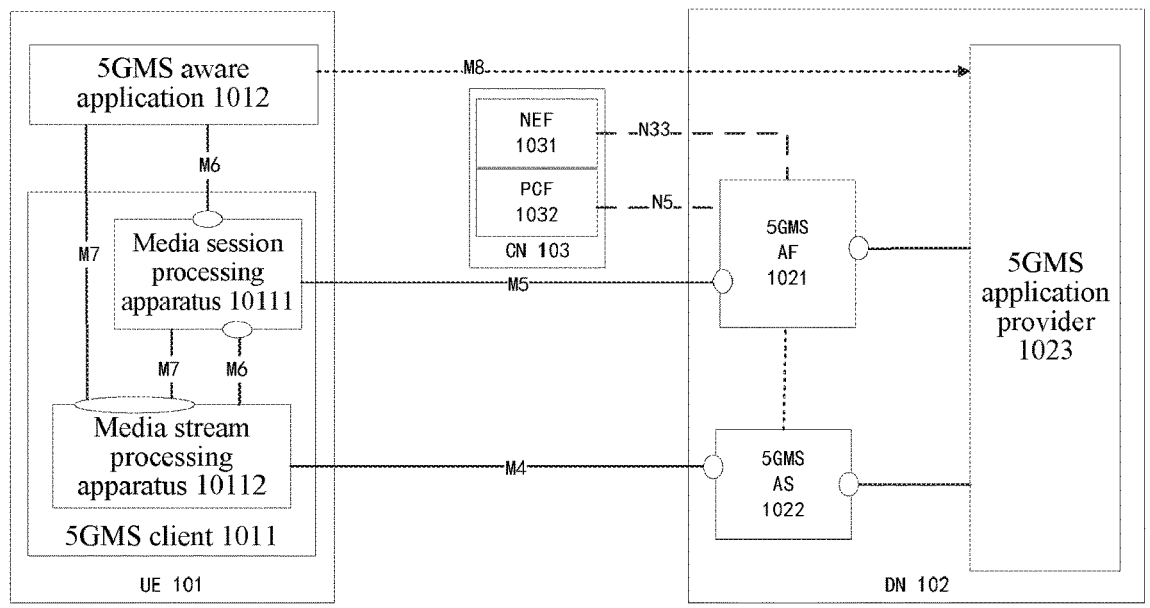
FIG. 1 shows an architecture of a communication system to which an embodiment of the disclosure is applicable.

To make the objectives, the technical solutions, and the advantages of the disclosure more obvious, exemplary embodiments according to the disclosure are described in detail below with reference to the accompanying drawings. In the accompanying drawings, same reference numerals represent same elements throughout. It is to be understood that the embodiments described herein are merely illustrative and are not be construed as limiting the scope of the disclosure.

In the current 5G media streaming system (5GMS) system, a policy for controlling a media stream service sent by a network side device to a user terminal does not take into account the service continuity of the media stream. Moreover, a flow description identifier related to the policy for controlling a media stream sent by the network side to the user terminal also includes only the following information: direction information of an IP flow (for example, whether the IP flow belongs to an uplink or a downlink), a source IP address, a destination IP address, an IP protocol, a source IP port, and a destination IP port. The media stream service may be further expanded into a generalized Internet data service.

Therefore, a network side device of the current 5GMS system cannot distinguish data of a plurality of media stream service types with the same IP address and port number. In addition, during the interaction between the network side device of the current 5GMS system and the user terminal, the network side device of the 5GMS system does not configure corresponding service continuity for the media stream service according to the actual service continuity requirements of the multimedia service.

To overcome defects existing in the conventional technologies, the disclosure provides a method for controlling transmission of a media stream service performed by a user terminal, a method for controlling transmission of a media stream service performed by a network node in a data network, a method for controlling transmission of a media stream service performed by a network node in a core network, a method for controlling transmission of a media stream service and an electronic device, a user terminal, a network node, a system, and a non-volatile computer-readable storage medium corresponding thereto.

In the embodiments of the disclosure, a policy template with a continuity feature is received from a network side device, and a user terminal may use, when initiating or changing a media stream service, a a protocol data unit (PDU) session with the appropriate continuity feature to carry the media stream service. Therefore, the user terminal may realize the continuity control of the media stream service during movement. In this way, the problem in the conventional technologies that the network side device cannot configure the corresponding service continuity for a media stream service of a specific type of the user terminal according to the actual service requirements of the multimedia service is solved.

In the embodiments of the disclosure, by receiving the service differentiators from the network side device, the user terminal may divide a specific media stream service into different types of service streams when initiating or changing the media stream service, and carry the service streams through different QoS streams in the same PDU session, to control the transmission of media streams and data streams in the current 5GMS system more finely.

In the embodiments of the disclosure, the network node of the data network may negotiate a continuity feature of at least one media stream service with the network node of the core network, so that the network side may control the service continuity when transmitting the media stream service.

In the embodiments of the disclosure, the network side device and the user terminal may use service differentiators to identify subdivision types of a media stream service, and divide media stream services with the same service differentiator by using service stream type identifiers, to realize finer QoS control and service continuity control of the media stream service.

Referring to FIG. 1, an architecture of a communication system to which an embodiment of the disclosure is applicable is described. The communication system may include a 5G system, or may include any other type of wireless communication system, for example, a 6G communication system. The embodiments of the disclosure are described by using the 5G system as an example below. However, the following description may also be applied to other types of wireless communication systems.

FIG. 1 shows an architecture of a communication system to which a method of an embodiment of the disclosure is applicable.

The various entities in FIG. 1 are briefly described below.

UE (that is, a user terminal) 101 may be referred to as user equipment (UE), which may be a device that provides voice and/or data connectivity to a user. The UE 101 may communicate with one or more service servers by using a radio access network (RAN). The UE 101 may be a mobile terminal, for example, a mobile phone (or referred to as a "cellular" phone) or a computer with a mobile terminal. For example, the UE 101 may be a portable, pocket-sized, handheld, computer built-in, or in-vehicle mobile apparatus, for example, a subscriber unit, a subscriber station, a mobile station, a mobile, a remote station, an access point, a remote terminal, an access terminal, a user terminal, a user agent, or a user device.

The UE 101 and a (radio) access network ((R)AN) 102 (referred to as (R)AN 102) establish a wireless connection through a wireless air interface. In an embodiment, the wireless air interface is a wireless air interface based on a 5G standard. For example, the wireless air interface is new radio (NR). Alternatively, the wireless air interface may be a wireless air interface based on a next-generation-of-5G mobile communication network technology standard (for example, 6G). In addition to the wireless access network, the access network may further include access technologies such as Wi-Fi, Bluetooth, and satellite.

As shown in FIG. 1, the UE 101 includes a plurality of modules or circuits to implement various functions in the 5G communication system. The UE 101 includes a 5GMS client 1011 and a 5GMS aware application 1012.

The 5GMS aware application 1012 is a functional entity provided by the 5GMS application provider and installed on the UE, which is mainly configured to implement other functions (for example, untrusted data transmission or non-media related functions) other than those of the 5GMS client 1011. The 5GMS aware application 1012 may interact with the 5GMS application provider 1023 on the network side through interfaces defined in the 5GMS architecture (for example, an M8 interface in FIG. 1), or interact with the 5GMS client through application interfaces (for example, M6 and M7 interfaces in FIG. 1).

The 5GMS client 1011 is another functional entity in the UE 101 for controlling 5G media stream transmission, which may be used for downlink, uplink, or both. The 5GMS client may be controlled by an internal or external media application, such as an application, which implements application or content service provider specific logic and allows media sessions to be established. The 5GMS client 1011 may include a 5G media stream processing apparatus 10112 and a 5G media session processing apparatus 10111.

The 5G media session processing apparatus 10111 may communicate with the 5GMS AF 1021 to establish, control, and support transmission of media sessions. The media session processing apparatus 10111 may expose an application interface M6 that may be used by the 5GMS aware application 1012 and the media stream processing apparatus 10112. The main functions of the media session processing apparatus 10111 include: session-level control of streaming media communication, collection and reporting of performance indicators, reporting of usage, provision of network auxiliary functions, configuration of media control interfaces for interacting with different UE media functions, configuration of media control interfaces for media session management, configuration of control interfaces for performance indicator collection and reporting, and the like.

The 5G media stream processing apparatus 10112 may transmit media stream content, may provide the 5GMS aware application 1012 with the application interface M7 for media playback, and provide the media session processing apparatus 10111 with the application interface M7 for media stream session control. That is, the application interface M7 may realize both the interaction with the 5GMS aware application 1012 and the interaction with the media session processing apparatus 10111.

The network side of the 5GMS system may include a data network (DN) 102 and a core network (CN) 103 in FIG. 1.

The CN 103 is a core network that may be used for 5G communication. The CN 103 includes a network node for a network exposure function (NEF) 1031 and a network node for a policy and charging rules function (PCF) 1032. A person skilled in the art would understand that the CN 103 may further support communication networks in later eras, such as 6G.

The DN 102 is a network responsible for providing data services for terminals. For example, some network nodes in the DN 102 are service servers that provide Internet access functions for the UE 101, and some other network nodes in the DN 102 are service servers that provide a short message function for the UE 101, and the like. The DN 102 mainly includes a 5GMS AF (5G network node for controlling media stream service functions) 1021, a 5GMS AS (application server dedicated to 5G streaming media) 1022, and a 5G application provider 1023.

The 5GMS AF 1021 is a network node in the DN 102 dedicated to controlling media streaming functions. As shown in FIG. 1, for a 5G media stream service, the 5GMS AF 1021 may provide media stream session configuration information to the media session processing apparatus 10111 through the interface M5 to implement media stream session processing and control, and assist in the transmission of media stream content. For example, the 5GMS AF 1021 may provide server addresses, delivery traffic reporting policies, performance index reporting policies, configuration related to network auxiliary information, and the like.

The 5GMS AF 1021 may deliver information such as a policy template for controlling the media stream service function to the media session processing apparatus 10111 through the interface M5, to control the implementation of the media streaming function.

The 5GMS AS 1022 may send or receive relevant data of the media stream service to the media stream processing apparatus 10112 or from the media stream processing apparatus 10112 through the interface M4.

The 5GMS AF 1021 may be directly connected to the NEF (network exposure function) 1031 and the PCF (policy and charging rules function) 1032 of the CN 103 through the interfaces N5 and N33 respectively, to support the functions related to network capability exposure, and policy and charging rules.

The NEF 1031 is a network node used in the 5G core network to provide frameworks, authentications, and interfaces related to network capability exposure, and to transfer information between network functions of the 5G system and other network functions. The 5GMS AF 1021 sends the application deployment location, distribution rules, routing rules, and other information to the NEF through the interface N33, and the information is finally sent to an SMF (a network node for session management functions, not shown) through network functions such as a policy control function (PCF). The SMF uses the information to select a data network access identifier (DNAI) and a user plane function (UPF), and set traffic distribution rules, routing rules, and the like.

The PCF 1032 interacts with the 5GMS AF 1021 through the interface N5, and has a main function of performing policy control in the 5G core network, which is similar to a policy and charging rules function (PCRF) network node in the LTE. The PCF 1032 is mainly responsible for the generation of policy authorization, service quality, and charging rules, and delivers the corresponding rules to the UPF network node through the SMF network element to complete the installation of the corresponding policies and rules.

The NEF 1031, the PCF 1032, or a combination thereof, or a combination thereof and any other network node is also referred to as a network node in the core network.

Figure 2A:
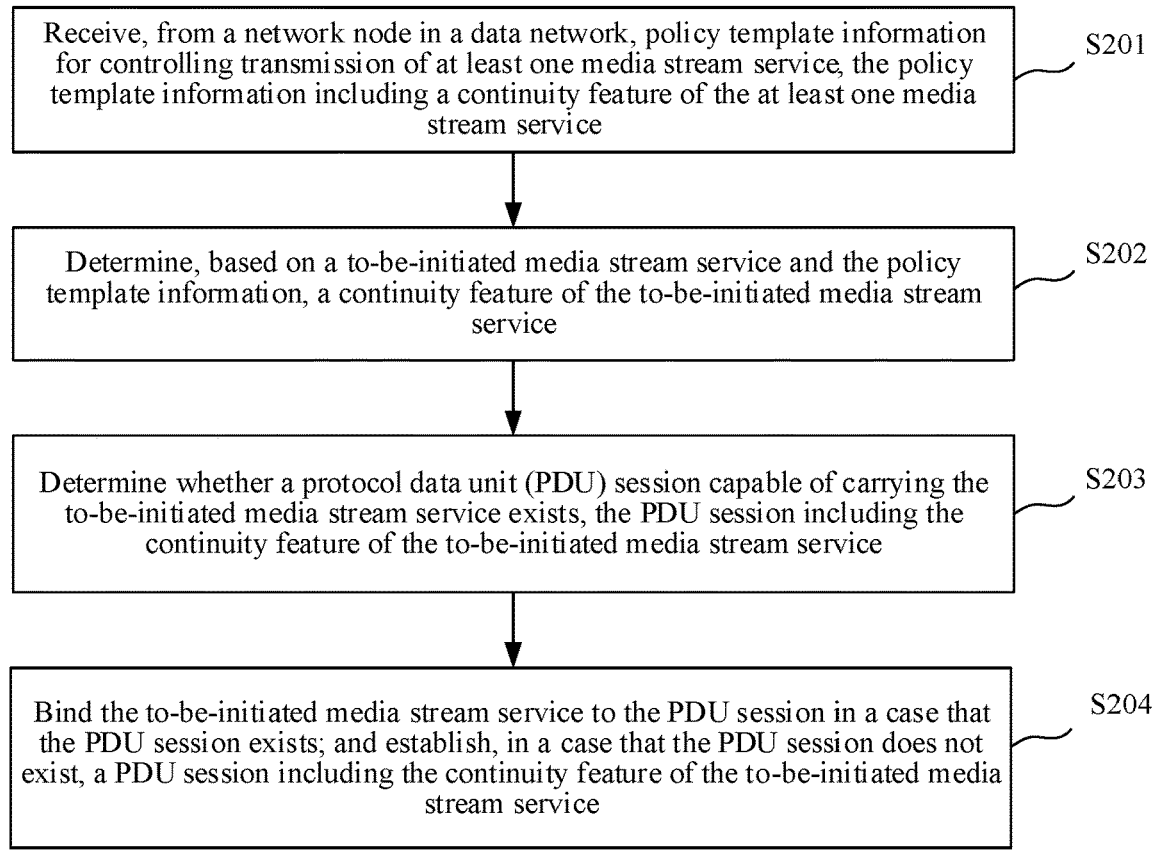
FIG. 2A is a flowchart of a method for controlling transmission of a media stream service performed by a user terminal to which an embodiment of the disclosure is applicable according to an embodiment of the disclosure.
Figure 2B:
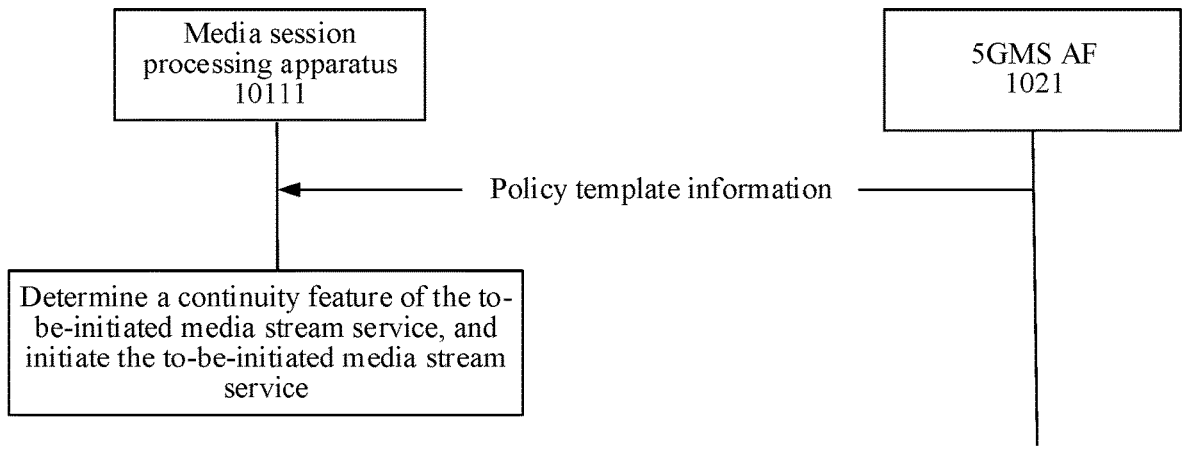
FIG. 2B is a schematic diagram of a method for controlling transmission of a media stream service performed by a user terminal to which an embodiment of the disclosure is applicable according to an embodiment of the disclosure.

FIG. 2A is a flowchart of a method 200 for controlling transmission of a media stream service performed by a user terminal to which an embodiment of the disclosure is applicable. FIG. 2B is a schematic diagram of a method 200 for controlling transmission of a media stream service performed by a user terminal to which an embodiment of the disclosure is applicable.

The method described in FIG. 2A and FIG. 2B may be performed by the UE 101 in FIG. 1. A description is made below by taking an example in which the UE 101 performs the method 200, including S201-S204.

In S201, the UE 101 receives, from a network node in a data network, policy template information for controlling transmission of at least one media stream service, the policy template information including a continuity feature of the at least one media stream service.

In an embodiment, as shown in FIG. 2B, the network node in the data network may be the 5GMS AF 1011 in FIG. 1. The module/circuit in the UE 101 for receiving the policy template information is the 5G media session processing apparatus 10111. It should be noted that a person skilled in the art would understand that the UE 101 may alternatively use other built-in modules or external modules to receive the policy template information.

The policy template information includes a set of parameters (also referred to as assets) that are negotiated by network nodes in the core network (the NEF 1031, the PCF 1032, or a combination thereof) and the 5GMS AF 1011. The parameters define the quality of service (QOS) and related charging policies of media stream services. The 5GMS AF 1011 may create, obtain, update, and delete related policy template resources in the process of negotiation with network nodes in the core network by creating a data model of the policy template. Therefore, the policy template information may also be referred to as policy templates, policy template resources, policy template resource information, policy template data, or the like. In the disclosure, the naming manner of the policy template information is used as an example, but the name of the policy template information is not limited.

Particularly, after receiving the policy template, the UE 101 may use the policy template as the local configuration information of the UE 101. When the UE 101 does not support a user equipment routing selection policy (URSP), or the URSP is not provided, or the URSP does not contain a requirement for service continuity, the media stream service is bound to a specific PDU session by using the policy template information, or whether a new PDU session is initiated is determined. The URSP defines service-level configuration and management policies, which are generated by network nodes in the core network and sent to a user terminal through a network control plane.

Generally, when the UE 101 supports and is provided with the URSP, the UE 101 may bind the media stream services to a specific PDU session according to the URSP, or determine whether to initiate a new PDU session. In many cases, the UE 101 may also not support or be provided with the URSP. In this case, the UE 101 may bind the media stream services to a specific PDU session according to the local configuration, or determine whether to initiate a new PDU session.

In an embodiment, the media stream services include media stream services of at least one service type. For example, an application may provide different traffic with many characteristics, and each type of traffic may correspond to one service type. For example, instant messaging software may include media stream services for voice calls, media stream services for text transmission, and the like. Alternatively, the instant messaging software may further include media stream services that require high QoS transmission, media stream services that require normal QoS transmission, media stream services that require high service continuity, and media stream services that do not require service continuity. The media stream service may be further expanded into a generalized Internet data service.

In an embodiment, a service differentiator may be used to indicate a service type and a matching feature of a media stream service. In an embodiment, service types are in one-to-one correspondence with service differentiators. The service differentiator is information that uses at least one of numbers, characters, and symbols to describe the service type. The service differentiator may also be referred to as other names such as a service difference symbol, a service differentiator, and a service type. In the disclosure, the service differentiator is used as an example for description, and the name of the service differentiator is not limited. The service differentiator is used for identifying a service type of traffic in an application. That is, the service differentiator is used for identifying a category of a packet of the application. The service differentiator may be determined by the 5GMS AF 1021, or by negotiation of the network nodes in the core network (the NEF 1031, the PCF 1032, or a combination thereof). The service differentiators are usually different between different applications. It should be noted that a person skilled in the art would understand that different applications may alternatively have the same service differentiator.

In an embodiment, the UE 101 may receive at least one service differentiator corresponding to the policy template information from the network node in the data network, the at least one service differentiator being used for distinguishing media stream services of different service types in the at least one media stream service; determine a service differentiator corresponding to a media stream service of a service type in the at least one media stream service based on the at least one service differentiator corresponding to the policy template information; and bind, based on the service differentiator, the media stream service of the service type to a quality of service (QoS) stream corresponding to the service differentiator in the PDU session.

In an embodiment, the UE 101 may receive a dynamic policy resource from the 5GMS AF 1021, where flow description identifiers in the dynamic policy resource include service differentiators.

For example, an improved dynamic policy resource in the embodiments of the disclosure is shown in Table 1 below.

TABLE 1

| Dynamic Policy Resource | |
|---|---|
| Attribute Name | Description |
| Policy template identifier | Identify which policy template is to be applied to the media stream service |
| Flow description identifier | Including only direction information of an IP flow (for example, whether the IP flow belongs to an uplink or a downlink), a source IP address, a destination IP address, an IP protocol, a source IP port, and a destination IP port, but also a service differentiator |
| Application service configuration Id | Uniquely identify the 5GMS downlink application service configuration, and may be linked to the application service provider |
| Enhancement method | Describe the policy enhancement method, and this parameter is set by 5GMS AF |

For example, the service differentiators may be further added to the dynamic policy resource limit as a subset of the flow description identifiers.

Therefore, the policy template information may be associated with the service differentiators through the dynamic policy resource, thereby indicating a session feature of a media stream service of at least one media stream service type, including a service continuity feature.

For example, it is assumed that a piece of policy template information has a policy template identifier: policyTemplateId-1. In a dynamic policy resource, a service differentiator included in a flow description identifier corresponding to policyTemplateId-1 is SD-1. The policy template information includes a continuity feature CF1 of a media stream service Since the service differentiator SD-1 and the continuity feature CF1 of the media stream service are associated through the policy template identifier policyTemplateId-1, the UE 101 may infer that the service differentiator SD-1 and the continuity feature CF1 of the media stream service are associated. That is, the media stream service corresponding to the flow description identifier including the service differentiator SD-1 is to have the continuity feature CF1 of the media stream service.

Alternatively, the dynamic policy resource may further store the service differentiators and the policy template identifiers in the form of a key-value pair to establish an association relationship between the service differentiators and the policy template identifiers, and further determine the correlation between the service differentiators and the continuity features of the media stream services through the association relationship. For example, the flow description identifiers of the service differentiators are used as keys and the policy template identifiers are used as values to construct the following key-value pairs: <flow description identifier corresponding to service differentiator SD-1, policy template identifier policyTemplateId-1>, <flow description identifier corresponding to service differentiator SD-2, policy template identifier policyTemplateId-2>, <flow description identifier corresponding to service differentiator SD-3, policy template identifier policyTemplateId-3>, and the like. For example, a dynamic policy resource may further construct a key-value pair with a policy template identifier as a key and a flow description identifier of a service differentiator as a value. For example, a dynamic policy resource may further construct a key-value pair with a policy template identifier as a key and a service differentiator as a value. The manner of associating the service differentiators with the policy template identifiers is not further limited in the disclosure.

In an embodiment, a plurality of service differentiators may correspond to one policy template identifier, a plurality of policy template identifiers may alternatively correspond to one service differentiator, and a plurality of service differentiators may alternatively correspond to a plurality of policy template identifiers. This is not limited in the disclosure.

In an embodiment, the policy template information may also include service differentiators. The policy template information indicates a continuity feature of at least one media stream service type by associating the service differentiator with the continuity feature. In an embodiment, the service differentiator is transmitted from the network node in the data network to the user terminal with the policy template information in the form of an asset of a policy template resource.

For example, it is assumed that a piece of policy template information has a policy template identifier: policyTemplateId-1. The policy template information includes a service differentiator SD-1 and a continuity feature CF1 of the media stream service. Since the service differentiator SD-1 and the continuity feature CF1 of the media stream service are bot located in the policy template information of the policy template identifier policyTemplateId-1, the UE 101 may infer that the service differentiator SD-1 and the continuity feature CF1 of the media stream service are associated. That is, the media stream service corresponding to the service differentiator SD-1 is to have the continuity feature CF1 of the media stream service.

Alternatively, the policy template information may alternatively store the service differentiators and the continuity features of the media stream services in the form of a key-value pair to establish an association relationship between the service differentiators and the continuity features of the media stream services. For example, the service differentiators are used as keys and the continuity features of the media stream services are used as values to construct the following key-value pairs: <service differentiator SD-1, continuity feature CF1 of media stream service>, <service differentiator SD-2, continuity feature of media stream service CF2>, <service differentiator SD-3, continuity feature of media stream service CF1>, and the like. The manner of associating the service differentiators with the continuity features of the media stream services is not further limited in the disclosure.

In an embodiment, the service differentiators include at least one of the following: type of service (TOS) information for Internet Protocol version 4 (IPv4), traffic class information for Internet Protocol version 6 (IPv6), flow label information for Internet Protocol version 6 (IPv6), or packet filter direction information.

The TOS is a field in a IP header of IPv4, which defines the service level of the message. In an embodiment, the TOS further includes a differentiated services code point (DSCP), which defines different priorities for the message: network control, inter-network control, critical, extremely fast, flash, fast, priority, and normal. Different DSCP values usually correspond to different types of services, for example, flash usually corresponds to the transmission of media stream data of voice, and fast usually corresponds to the transmission of media stream data of video.

A length of an IPv6 IP address is 128 bits, while a length of an IPv4 IP address is 32 bits. Therefore, for IPv6, more fields may be used to represent types of media stream services.

The traffic class information is a field in an IP header using IPv6, which is used to identify a traffic flow class corresponding to IPv6, or a priority level, and has a function similar to a type of service (ToS) field in IPv4.

The flow label information is another field in the IP header using IPv6, which may be used to mark a data stream type of the packet, to distinguish different packets at the network layer, and perform QoS processing for specific service streams.

The packet filter direction information indicates whether the packet belongs to the uplink or downlink. Therefore, different continuity services may be set for the transmission direction of the packets.

In an embodiment, the flow description identifiers may include not only the service differentiators, but also an IP quintuple. The IP quintuple includes a source IP address, a source port, a destination IP address, a destination port, and a transport layer protocol.

In an embodiment, the continuity feature of the media stream service is a session and service continuity (SSC) mode, and the session and service continuity mode is transmitted from the network node in the data network to the user terminal with the policy template information in the form of an asset of a policy template resource.

In the embodiments of the disclosure, the SSC mode may be used to represent a session and service continuity of the media stream. A person skilled in the art would understand that other parameters may be alternatively used to represent the continuity feature of the media stream.

Specifically, the SSC mode is associated with a protocol data unit (PDU) session and remains unchanged for the duration of the PDU session. The 5G network defines the following three SSC modes:

SSC mode 1: The network does not change a PDU session anchor for the terminal to access the service, and ensures that the IP address remains unchanged when the UE accesses the service.

SSC mode 2: The network may establish a new PDU session anchor for the UE to access the service, and before the new PDU session anchor is established, the network releases an old PDU session anchor for the UE to access the service.

SSC mode 3: The network releases a previous PDU session anchor after the new PDU session anchor is established, to ensure service continuity.

For example, Table 1 shows an example of the policy template information, which exemplarily shows some parameters of a policy template. In Table 1, the SSC mode is sent from the 5GMS AF 1021 to the UE 101 with the policy template information in the form of an asset of the policy template resource.

TABLE 2

Policy Template Information

| Property | Description |
| --- | --- |
| Policy template identifier | A unique identifier for this policy template within the scope of the provisioned session. |
| State | The policy template may be in a pending, ready, or paused state. Only a policy template in a ready state can be instantiated as a dynamic policy instance and applied to a streaming session. |
| API endpoint | An API endpoint that is to be called when a dynamic policy instance is activated based on this policy template |
| External reference | An additional identifier for this policy template, which is unique within the scope of its provisioning session, and can be cross-referenced with external metadata about the streaming session |
| QoS specification | Specify the network quality of service to be applied to the streaming session in this policy template |
| Application session context | Specify information about the application session context to which this policy template can be applied |
| AF application identifier | Identifier of the application function (AF) application, such as the identifier of the 5GMS AF 1021 |
| Slice information | Network slice information |
| Data network name (Dnn) | Data network name |
| Session and service continuity (SSC mode) | Session and service continuity mode |
| aspId | Identifier of the application service provider, for example, the identifier of the 5GMS applicationprovider 1023 |
| Charging specification | Provide information about the charging policy to be used for this policy template |

In an embodiment, the session and service continuity mode is sent from a network node in the data network to the user terminal with the policy template information in the form of parameters in the application session context in the policy template resource.

For example, Table 3 shows another example of the policy template information, which exemplarily shows some parameters of a policy template. In Table 2, the service differentiator is sent from the 5GMS AF 1021 to the UE 101 with the policy template information in the form of an asset of the policy template resource. The SSC mode is transmitted from the network node in the data network to the user terminal with the policy template information in the form of a parameter in application session context in a policy template resource.

TABLE 3

Policy Template Information

| Property | Description |
|---|---|
| Policy template identifier | A unique identifier for this policy template within the scope of the provisioned session. |
| State | The policy template may be in a pending, ready, or paused state. Only a policy template in a ready state can be instantiated as a dynamic policy instance and applied to a streaming session. |
| API endpoint | An API endpoint that is to be called when a dynamic policy instance is activated based on this policy template |
| External reference | An additional identifier for this policy template, which is unique within the scope of its provisioning session, and can be cross-referenced with external metadata about the streaming session |
| QoS specification | Specify the network quality of service to be applied to the streaming session in this policy template |
| Application session context | Specify information about the application session context to which this policy template can be applied, including the SCC mode as parameters |
| AF application identifier | Identifier of the AF application, for example, the identifier of the 5GMS AF 1021 |
| Slice information | Network slice information |
| Data network name (Dnn) | Data network name |
| aspId | Identifier of the application service provider, for example, the identifier of the 5GMS application provider 1023 |
| Service differentiator | Provide a service type of a media stream for the policy template |
| Charging specification | Provide information about the charging policy to be used for this policy template |

A person skilled in the art would understand that the SSC mode and the service differentiators may be alternatively sent to the user terminal from a network node (for example, the 5GMS AF 1012) in the data network in other manners. For example, the SSC mode and the service differentiators may be transmitted from the 5GMS AF 1012 to the UE 101 with the policy template information in the form of parameters in application session context in a policy template resource. The manner of obtaining the SSC mode and the service differentiators is not limited in the disclosure.

In S202, the UE 101 determines, based on a media stream service to be initiated and the policy template information, a continuity feature of the media stream service.

For example, it is assumed that the policy template information indicates that all media stream services of the application A need to be carried by using a PDU session with SSC mode 1. When the UE 101 initiates the media stream services of the application A, it may be determined that a continuity feature of the media stream services of the application A is the SSC mode 1.

For example, it is assumed that the policy template information and the flow description identifiers both indicate that a packet with a TOS value of x in the media stream services of the application A needs to be carried by the PDU session with the SSC mode 1, and a packet with a TOS value of y in the media stream services of the application A needs to be carried by the PDU session with the SSC mode 2. When the UE 101 initiates the media stream service with the TOS value of x of the application A, it may be determined that a continuity feature of the media stream service with the TOS value of x of the application A is the SSC mode 1. When the UE 101 initiates the media stream service with the TOS value of y of the application A, it may be determined that a continuity feature of the media stream service with the TOS value of y of the application A is the SSC mode 2.

In addition, if the policy template information includes a service differentiator, the UE 101 may search the policy template information for an SSC mode that matches a service type of a media stream service, to determine a continuity feature of the media stream service.

In S203, the UE 101 determines whether a protocol data unit (PDU) session capable of carrying the media stream service exists, the PDU session including the continuity feature of the media stream service.

In S204, the UE 101 binds the media stream service to the PDU session in a case that the PDU session exists; and establishes, in a case that the PDU session does not exist, a PDU session including the continuity feature of the media stream service.

Since an SSC mode of a PDU session does not change during existence, in a case that a PDU session matching a continuity feature of a media stream service exists, the UE 101 may bind the media stream service to the PDU session, so that the PDU session may carry the media stream service. If there is no PDU session that matches the continuity feature of the media stream service, the UE 101 needs to establish a PDU session (that is, a PDU session with a specific SSC mode) that meets the continuity requirements of the media stream service.

By receiving the policy template with the SSC mode from the 5GMS AF 1021, the UE 101 may use, when initiating or changing a media stream service, a PDU session with the appropriate SSC mode to carry the media stream service. Therefore, the UE 101 may realize the continuity control of the media stream service during movement. In this way, the problem in the conventional technologies that a data network cannot configure the corresponding service continuity for a media stream service for the user terminal is solved.

One PDU session may include different QoS streams. In an embodiment, the UE 101 may further bind a media stream service of a specific service type to a quality of service (QoS) stream corresponding to a service differentiator in the PDU session based on the service differentiator. For example, media stream services used for payment in the media stream services of the application A may be carried by the service streams with a higher QoS level in the PDU session, and media stream services used for traffic reporting in the media stream services of the application A may be carried by the service streams with a normal QoS level in the PDU session. Alternatively, the media stream service with the TOS value of x in the media stream services of the application A may be carried by the service streams with a higher QoS level in the PDU session, and the media stream service with the TOS value of y in the media stream services of the application A may be carried by the service streams with a normal QoS level in the PDU session.

Therefore, an embodiment of the disclosure further provides a method for controlling transmission of a media stream service performed by a user terminal. The method includes: receiving, from a network node in a data network, policy template information for controlling transmission of media stream services and at least one service differentiator corresponding to the policy template information, the at least one service differentiator being used for distinguishing media stream services of different service types in the at least one media stream service; determining a service differentiator corresponding to a media stream service of a service type in media stream services based on the policy template information and the at least one service differentiator; and binding, based on the service differentiator, the media stream service of the service type to a quality of service (QoS) stream corresponding to the service differentiator in the PDU session. The policy template information may be considered as a local policy of the user terminal.

Therefore, a media stream service of a specific service type may be transmitted through different QoS streams of the same PDU session, or a specific service stream may be transmitted through different PDU sessions, where the different PDU sessions may have at least one different parameter among service continuity, network slicing, and DNN.

In an embodiment, in a case that the user terminal 101 supports the URSP, the user terminal may further receive at least one service differentiator from a network node in a core network, the service differentiator being used for distinguishing media stream services of different service types in the at least one media stream service. Based on the at least one service differentiator, the user terminal then determines a service differentiator corresponding to a media stream service of one service type in the media stream services, and binds, based on the service differentiator, the media stream service of the service type to a QoS stream corresponding to the service differentiator in the PDU session.

For example, the service differentiator may be delivered from the PCF 1032 to the user terminal 101 through the URSP. The service differentiator may be determined through negotiation of the 5GMS AF 1021 and the NEF/PCF. The URSP generated at the PCF includes the service differentiator determined through negotiation of the 5GMS AF 1021 and the NEF/PCF.

In an embodiment, in a case that the user terminal supports the URSP, the user terminal may further receive the continuity feature of the media stream service from a network node in a core network; determine a continuity feature of the media stream service based on the continuity feature; and bind the media stream service to the PDU session with the continuity feature based on the continuity feature.

For example, when the service continuity feature is the SSC mode, the SSC mode may be alternatively delivered from the PCF 1032 to the user terminal 101 through the URSP. The SSC mode may be determined through negotiation of the 5GMS AF 1021 and the NEF/PCF. The URSP generated at the PCF includes the SSC mode determined through negotiation of the 5GMS AF 1021 and the NEF/PCF.

In a case that the user terminal 101 supports the URSP, the user terminal may further receive the service differentiator and the SSC mode from the network node in the core network.

If both a policy template with the SSC mode and a service differentiator corresponding to the policy template are received from the 5GMS AF 1021, the UE 101 may use a PDU session with an appropriate SSC mode to carry a media stream service of a specific service type. Therefore, the UE 101 may realize the continuity control of a media stream service of a specific type during movement. In this way, the problem in the conventional technologies that a data network cannot configure the corresponding service continuity for a media stream service of a specific type for the user terminal is solved.

Figure 3A:
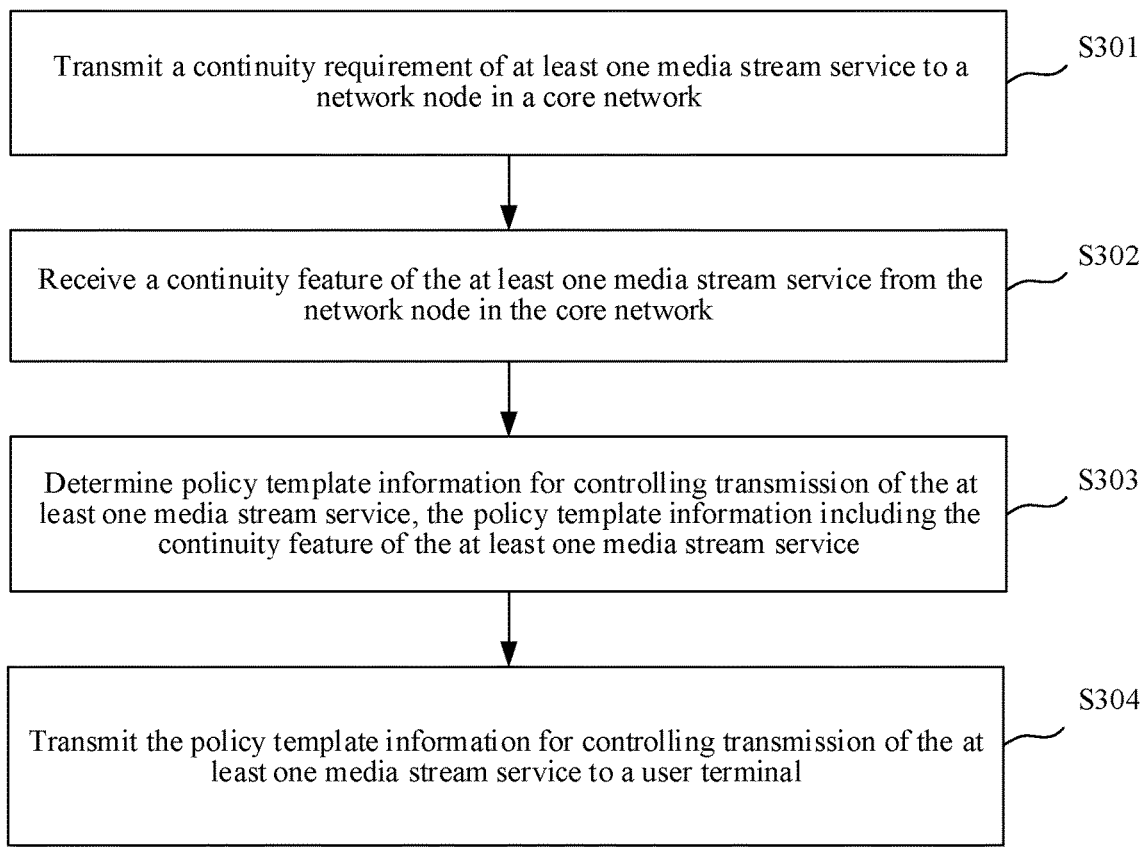
FIG. 3A is a flowchart of a method for controlling transmission of a media stream service performed by a network node in a data network according to an embodiment of the disclosure.
Figure 3B:
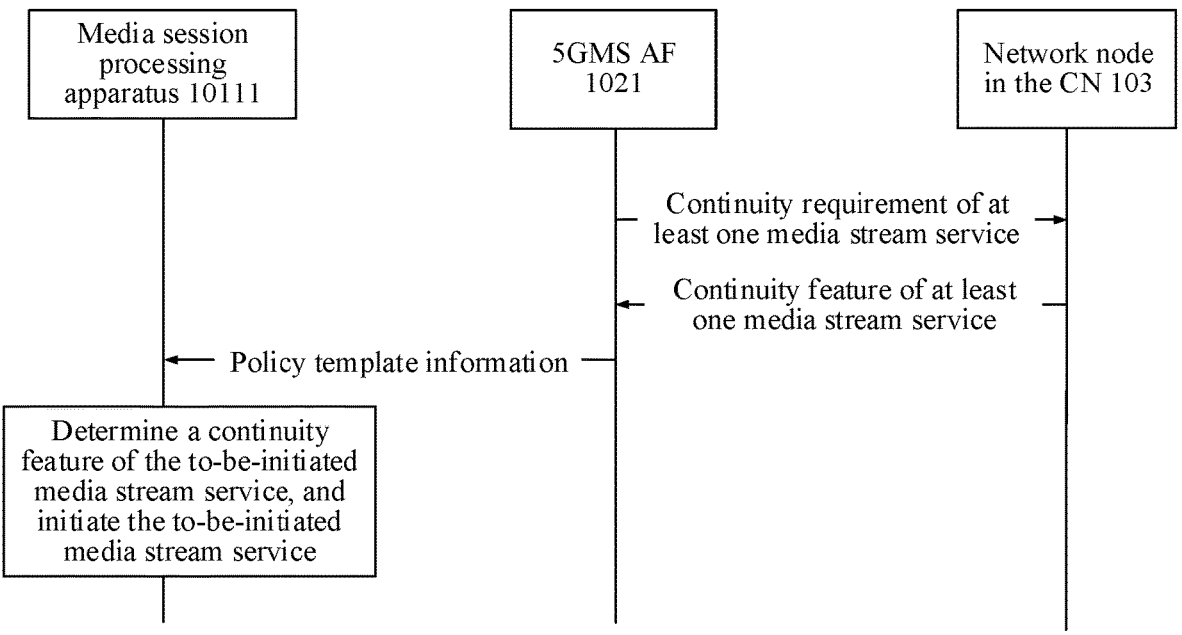
FIG. 3B is a schematic diagram of a method for controlling transmission of a media stream service performed by a network node in a data network to which an embodiment of the disclosure is applicable according to an embodiment of the disclosure.

FIG. 3A is a flowchart of a method 300 for controlling transmission of a media stream service performed by a network node in a data network. FIG. 3B is a schematic diagram of a method 300 for controlling transmission of a media stream service performed by a network node in a data network to which an embodiment of the disclosure is applicable.

The method described in FIG. 3A and FIG. 3B may be performed by the 5GMS AF 1021 in FIG. 1. A description is made below by taking an example in which the 5GMS AF 1021 performs the method 300, which includes S301-S304.

As shown in FIG. 3A and FIG. 3B, in S301, the 5GMS AF 1021 sends a continuity requirement of at least one media stream service to a network node in the core network (for example, the NEF 1031 or the PCF 1032, or a combination thereof).

In an embodiment, the at least one media stream service corresponds to a service type of at least one media stream. Therefore, the 5GMS AF 1021 transmits a continuity requirement of a service type of at least one media stream to a network node (for example, the NEF 1031 or the PCF 1032, or a combination thereof) in the core network.

For example, the 5GMS AF 1021 sends continuity requirements of media stream services of an application A and an application B to a network node in the core network (for example, the NEF 1031 or the PCF 1032, or a combination thereof). The media stream services of the application A may include a first media stream service with a TOS value of x and a second media stream service with a TOS value of y. The media stream services of the application B may include a third media stream service with first flow label information and a fourth media stream service with second flow label information. The first media stream service, the second media stream service, the third media stream service, and the fourth media stream service may have different and the same continuity requirements.

Therefore, the 5GMS AF 1021 sends the continuity requirements of the media stream services of the application A and/or the application B to a network node in the core network (for example, the NEF 1031 or the PCF 1032, or a combination thereof). The 5GMS AF 1021 may alternatively only send a continuity requirement of a media stream service identified with flow label information to a network node in the core network (for example, the NEF 1031 or the PCF 1032, or a combination thereof). For example, the 5GMS AF 1021 sends a request to a network node in the core network to request the network node of the core network to set a specific continuity feature for all media stream services with the first flow label information. This is not limited in the disclosure.

In an embodiment, the continuity requirement of at least one media stream service may be described in various manners. For example, the continuity requirement of at least one media stream service may be described in text: "this service needs to ensure service continuity with the IP address of the UE being unchanged", "the IP address of the UE can be changed during the execution of this service but the service is not interrupted", or the like. The continuity requirement of at least one media stream service may be alternatively directly described by an indicator of the SSC mode (for example, if the SSC mode 1 is adopted, an indicator "1" may be directly used), which indicates that the media stream service requires a specific SSC mode. The form of the continuity requirement is not limited in the disclosure.

The network nodes in the core network include network nodes (for example, the NEF 1031) for controlling a network exposure function and network nodes (for example, the PCF 1032) for controlling a network policy and charging rules function.

For example, the 5GMS AF 1021 may need to establish a media stream session with the UE 101 using the 5G media stream network for the transmission of services (for example, video conferencing). The media stream service has a specific continuity requirement, for example, requires that the IP address remains unchanged during the session existence, to ensure the continuity of the media stream session service. Therefore, a network node (for example, the NEF 1031 or the PCF 1032, or a combination thereof) of the 5G core network determines a corresponding service continuity feature (for example, an SSC mode) for this part of the service according to the requirements proposed by the 5GMS AF 1021, and may set a corresponding rate for the media stream service according to the determined service continuity feature.

In an embodiment, the 5GMS AF 1021 may locally look up a service type of at least one media stream corresponding to the media stream service, and send a service type of the at least one media stream corresponding to the media stream service to a network node in the core network (for example, the NEF 1031 or the PCF 1032, or a combination thereof). The network node in the core network (for example, the NEF 1031 or the PCF 1032, or a combination thereof) may further determine a service differentiator of a service type of the at least one media stream corresponding to the media stream service according to a network protocol or agreement related to the media stream service.

In an embodiment, to enable the network node in the core network to more accurately and finely set the service continuity feature (for example, the SSC mode) for the media stream service, the 5GMS AF 1021 may further send the service differentiator corresponding to the at least one media stream service to the network node in the core network, to indicate at least one service type corresponding to the media stream service.

The at least one service differentiator includes at least one of the following: type of service (TOS) information for Internet Protocol version 4 (IPv4), traffic class information for Internet Protocol version 6 (IPv6), flow label information for Internet Protocol version 6 (IPv6), or packet filter direction information.

The different service differentiators described herein indicate that any one of the type of service (TOS) information for Internet Protocol version 4 (IPv4), traffic class information for Internet Protocol version 6 (IPv6), flow label information for Internet Protocol version 6 (IPv6), or packet filter direction information included in the service differentiators is different. A person skilled in the art would understand that various other fields may be alternatively included in the service differentiators, which may also result in different service differentiators. This is not limited in the disclosure.

Based on this, the network node (for example, the NEF, the PCF, or both) in the core network may set a service continuity feature (for example, an SSC mode) for the media stream service according to the requirements proposed by the 5GMS AF 1021. In an embodiment, the network node in the core network may further determine corresponding different service continuity features (for example, SSC modes) for different media stream service types in the media stream services.

In an embodiment, a specific media stream service (for example, a media stream service of the application A) may correspond to a plurality of service stream types (for example, media stream services with different functions). For example, a video media stream session includes data transmission of upstream video media stream services, data transmission of downstream video media streams, control data transmission of upstream video media stream services, control data transmission of downstream video media streams, and the like. Different service stream types may alternatively correspond to different service continuity features.

For example, in an embodiment, the 5GMS AF 1021 may further transmit service stream type identifiers to a network node in a core network, the service stream type identifiers being used for describing media stream services of different functions in at least one media stream service. Alternatively, the service stream type identifiers may represent features of the media stream service types. For example, the service stream type identifier may indicate that a specific media stream service is one of the following: media data, network auxiliary information, usage reporting information, or the like. Therefore, the service streams of media streams of different functions may be distinguished by the service stream type identifiers. Since media stream services of different service stream types may be carried by service streams with different QoS, a network node of the 5G core network may be used to indicate service differentiators that different media stream service types need to be provided with to the 5GMS AF 1021 according to the service stream type identifiers. Therefore, a service stream of a specific service type may be transmitted by different QoS streams of the same PDU session through a service differentiator that is negotiated by the network; or a specific service stream may be transmitted by different PDU sessions.

In an embodiment, the 5GMS AF 1021 may further send other service requirements and related information about the media stream services to network nodes (for example, the NEF 1031, the PCF 1032, or both) in the core network (for example, the CN 103), to assist the network nodes in the CN 103 to be able to set, according to requirements proposed by the 5GMS AF 1021, a more accurate network policy (that is, a policy template subsequently delivered by the 5GMS AF 1021 to the UE 101) for the media stream services that is more in line with the network agreement signed between the user and the core network. For example, the 5GMS AF 1021 may further send identification information of the 5GMS AF 1021, identification information of the 5GMS application provider 1023, QoS requirement information, network slice requirement information, and the like to the network node in the core network. The information sent by the 5GMS AF 1021 to the network nodes in the core network are not limited in the disclosure, as long as the information may help the core network and the 5GMS AF to negotiate a policy for service transmission.

Step S302: Receive a continuity feature of the at least one media stream service from the network node in the core network.

In an embodiment, in a case that the 5GMS AF 1021 does not send the service differentiator corresponding to the at least one media stream service type to the network node in the CN 103, the network node in the core network determines a service differentiator corresponding to the media stream service type based on a network policy or local configuration information thereof. Therefore, it may be ensured that the configuration of the service differentiator on the service server side (for example, the 5GMS AF 1021) is consistent with the configuration on the user plane and the URSP in the CN 103.

In an embodiment, in a case that the 5GMS AF 1021 sends the service differentiator corresponding to the at least one media stream service type to the network node in the CN 103, the network node in the CN 103 checks whether the service differentiator matches a network policy or local configuration information thereof. If the service differentiator matches the network policy or the local configuration information thereof, the network node in the core network may determine a service differentiator corresponding to the at least one media stream service type, and return the service differentiator to the 5GMS AF 1021. If the service differentiator does not match the network policy or the local configuration information thereof, the network node in the core network may modify or update the service differentiator sent by the 5GMS AF 1021 based on the network policy or the local configuration information, and return the service differentiator to the 5GMS AF 1021.

In an embodiment, in a case that the 5GMS AF 1021 transmits service stream type identifiers to a network node in a core network in S302, the 5GMS AF 1021 may further receive a continuity feature of the media stream service type corresponding to the service stream type identifier from the network node in the core network. Alternatively, the network node in the core network determines the service differentiator corresponding to the service stream type identifier based on the local configuration and the network policy. The service differentiator and the continuity feature corresponding to the service differentiator are then returned to the 5GMS AF 1021.

Step S303: Determine policy template information for controlling transmission of the at least one media stream service, the policy template information including the continuity feature of the at least one media stream service.

The 5GMS AF 1021 may determine, according to the information received from the network node in the core network, policy template information used for controlling transmission of the at least one media stream service.

For example, it is assumed that the network node in the core network sends a service differentiator, an SSC mode, and a service stream type identifier in the following Table 4 to the 5GMS AF 1021, and the information in the same row represents a set of association relationships.

TABLE 4

Continuity correspondence of network node feedback for network control of media stream determination

| Service differentiator | Service stream type identifier | SSC mode |
|---|---|---|
| SD1 | Media data | SSC mode 1 |
| SD1 | Usage reporting information | SSC mode 2 |
| SD2 | Index reporting information | SSC mode 3 |

For example, the 5GMS AF 1021 may populate the policy template information according to the foregoing information, for example, policy template information and/or dynamic policy resource information for usage reporting data. For example, the 5GMS AF may determine policy template information as shown in Table 5 below:

TABLE 5

Policy Template Information

| Property | Value |
|---|---|
| Policy template identifier | policyTemplateId-1 |
| ... | ... |
| Application session context | The parameters of the application context include: <flow description identifier including SD1, SSC mode 1>, <flow description identifier including SD2, SSC mode 2> |
| ... | ... |

For example, the 5GMS AF 1021 may further populate the policy template information according to the foregoing information. For example, for the policy template information of the media data, the 5GMS AF 1021 may determine policy template information as shown in Table 6 below:

TABLE 6

Policy Template Information

| Property | Value |
|---|---|
| Policy template identifier | policyTemplateId-1 |
| ... | ... |
| Session and service continuity (SSC) mode | SSC mode 1 |
| Flow description identifier | Flow description identifier, including service differentiator SD1 |
| ... | ... |

" . . . " in Table 5 and Table 6 represents unshown assets and corresponding values thereof, and the content and form of other fields in the policy template information are not limited in the disclosure.

In S304, the 5GMS AF 1021 transmits the policy template information for controlling transmission of the at least one media stream service to a user terminal.

Based on the method 300, the 5GMS AF 1021 may negotiate a continuity feature of at least one media stream service with the network node of the core network, so that the network side device may control the service continuity when transmitting media stream services according to service requirements. The 5GMS AF 1021 may negotiate a service differentiator of at least one media stream service with the network node of the core network, to realize finer QoS control of the media stream service.

By receiving the policy template with the SSC mode from the 5GMS AF 1021, the UE 101 may use, when initiating or changing a media stream service, a PDU session with the appropriate SSC mode to carry the media stream service. Therefore, the UE 101 may realize the continuity control of the media stream service when initiating or changing a media stream service.

In particular, the policy template may be used as the local configuration information of the UE. When the UE does not support the URSP rules, according to the information in the policy template, the media stream services are bound to a specific PDU session according to the local configuration, or whether to initiate a new PDU session is determined. Therefore, the problem in the conventional technologies that the network side device cannot determine the service continuity of the service according to the service continuity requirement of the service provider, and the problem that the device in the data network cannot configure a policy template with specific service continuity for the UE may be solved.

An embodiment of the disclosure further provides a method for controlling transmission of a media stream service performed by a network node in a data network. The method includes: transmitting service differentiators of media stream services to a network node in a core network, the service differentiators being used for distinguishing media stream services of different service types in the at least one media stream service; receiving service differentiators determined by the network node in the core network from the network node in the core network; determining policy template information corresponding to the determined service differentiators and used for controlling transmission of the media stream services; and transmitting the policy template information for controlling transmission of the at least one media stream service and the determined service differentiators to a user terminal.

Therefore, according to the embodiments of the disclosure, the service streams of media streams of different functions and types may be distinguished by the service differentiators. Since media stream services of different service differentiators may be carried by service streams with different QoS, a network node of the 5G core network may be used to indicate different service differentiators that different media stream service types need to be provided with to the 5GMS AF 1021. Therefore, a service stream of a specific service type may be transmitted by different QoS streams of the same PDU session through a service differentiator that is negotiated by the network; or a specific service stream may be transmitted by different PDU sessions.

/////////An embodiment of the disclosure further provides a method for controlling transmission of a media stream service performed by a network node in a data network. The method includes: transmitting service stream type identifiers of media stream services to a network node in a core network, the service stream type identifiers being used for describing media stream services of different functions in the at least one media stream service; receiving service differentiators of the media stream services from the network node in the core network, the service differentiators being corresponding to the service stream type identifiers; determining policy template information corresponding to the determined service differentiators and used for controlling transmission of the media stream services; and transmitting the policy template information for controlling transmission of the at least one media stream service and the determined service differentiators to a user terminal.

Therefore, according to the embodiments of the disclosure, the service streams of media streams of different functions may be distinguished by the service differentiators. Since media stream services of different service stream types may be carried by service streams with different QoS, a network node of the 5G core network may indicate service differentiators that media stream service types corresponding to different service stream type identifiers need to be provided with to the 5GMS AF 1021. Therefore, a service stream of a specific service type may be transmitted by different QoS streams of the same PDU session through a service differentiator that is negotiated by the network; or a specific service stream may be transmitted by different PDU sessions.

Figure 4:
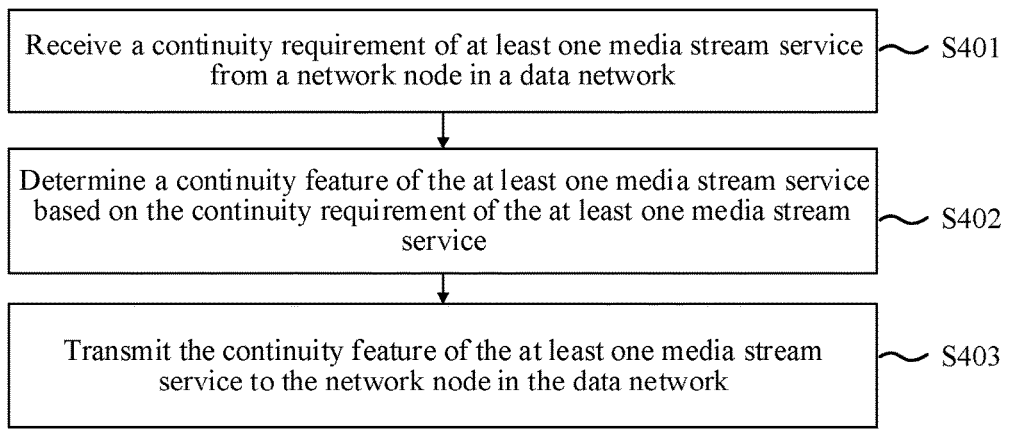
FIG. 4 is a flowchart of a method for controlling transmission of a media stream service performed by a network node in a data network according to an embodiment of the disclosure.

FIG. 4 is a flowchart of a method 400 for controlling transmission of a media stream service performed by a network node in a data network.

The method 400 described in FIG. 4 may be performed by the NEF 1031 or the PCF 1032 in FIG. 1, or a combination thereof. The NEF 1031, the PCF 1032, or a combination thereof may be alternatively referred to as a network node in the core network.

The method 400 includes S401-S403. As shown in FIG. 4, in S401, the network node in the CN 103 receives a continuity requirement of at least one media stream service from a network node in a data network;

In an embodiment, the at least one media stream service may correspond to a service type of at least one media stream.

The network node in the CN 103 may set a corresponding service continuity feature (for example, the SSC mode) for the media stream service according to a service continuity requirement related to the media stream service proposed by the 5GMS AF 1021, and set a corresponding rate for the media stream service according to the set service continuity feature.

In an embodiment, the media stream service may correspond to a plurality of service types. For example, a video media stream session includes data transmission of upstream video media stream services, data transmission of downstream video media streams, control data transmission of upstream video media stream services, control data transmission of downstream video media streams, and the like. Different media stream service types may correspond to different QoS requirements.

In S402, the network node in the core network determines a continuity feature of the at least one media stream service based on the continuity requirement of the media stream service.

The 5GMS AF 1021 may locally look up at least one service type corresponding to the media stream service, and send at least one service type (for example, a service differentiator) corresponding to the media stream service to a network node in the CN 103 (for example, the NEF 1031 or the PCF 1032, or a combination thereof).

The network node in the CN 103 (for example, the NEF 1031 or the PCF 1032, or a combination thereof) may further determine the at least one service type (for example, the service differentiator) corresponding to the media stream service according to a network protocol related to the media stream service and signed with the user.

For example, the 5GMS AF 1021 may require that the media stream service has specific service continuity. The network node in the CN 103 looks up the agreement signed with the user, and if it is found that the user has not paid for a service of specific continuity, the CN 103 rejects the requirement of the 5GMS AF 1021, and only sets basic service continuity for the service of this media stream.

In an embodiment, to enable the network node in the core network to more accurately and finely set QoS for media stream services, the network node in the CN 103 may further receive a service differentiator corresponding to the at least one media stream service from the network node in the DN 102, the at least one service differentiator being used for distinguishing media stream services of different service types in the at least one media stream service.

The at least one service differentiator includes at least one of the following: type of service (TOS) information for Internet Protocol version 4 (IPv4), traffic class information for Internet Protocol version 6 (IPv6), flow label information for Internet Protocol version 6 (IPv6), or packet filter direction information.

The different service differentiators described herein indicate that any one of the type of service (TOS) information for Internet Protocol version 4 (IPv4), traffic class information for Internet Protocol version 6 (IPv6), flow label information for Internet Protocol version 6 (IPv6), or packet filter direction information included in the service differentiators is different. A person skilled in the art would understand that various other fields may be alternatively included in the service differentiators, which may also result in different service differentiators. This is not limited in the disclosure.

The network node in the core network may determine the continuity feature of the media stream service (or at least corresponding to one media stream service type) based on the media stream service (or a service differentiator corresponding to at least a specific media stream service type) and the continuity requirement. That is, the network node in the core network may indicate the continuity feature of at least one media stream service type by associating the service differentiator with the continuity feature.

In an embodiment, in a case that the network node in the core network receives the service differentiator corresponding to the at least one media stream service from the 5GMS AF 1021, the network node in the core network checks whether the service differentiator matches a network policy or local configuration information thereof. If the service differentiator matches the network policy or the local configuration information thereof, the network node in the core network may determine a service differentiator corresponding to the media stream service according to the network policy, and return the service differentiator to the 5GMS AF 1021. If the service differentiator does not match the network policy or the local configuration information thereof, the network node in the core network may modify or update the service differentiator sent by the 5GMS AF 1021 based on the network policy or the local configuration information, and return the service differentiator to the 5GMS AF 1021.

In an embodiment, in a case that the 5GMS AF 1021 does not send the service differentiator corresponding to the at least one media stream service to the network node in the core network, the network node in the core network determines at least one service differentiator corresponding to the media stream service type based on a network policy or local configuration information thereof. Therefore, it may be ensured that the configuration of the service differentiator on the service server side (for example, the 5GMS AF 1021) is consistent with the URSP rules sent to the UE at the network side and the configuration on the user plane in the CN 103.

In an embodiment, the network node in the core network may further receive service stream type identifiers from the 5GMS AF 1021, where the service stream type identifiers represent features of the at least one media stream service types or functional features of the media stream services. For example, the service stream type identifier may indicate that a specific media stream service is one of the following: media data, network auxiliary information, usage reporting information, or the like. The network node of the 5G core network may assign a specific service differentiator to a data stream of the service type according to the service stream type identifier, to indicate service differentiators corresponding to different service stream type identifiers to the 5GMS AF 1021. Therefore, the service server may set a specific service differentiator for a service stream of a specific service type, and the service stream of the specific service type may be transmitted through different QoS streams of the same PDU session; or the service stream of the specific service type may be transmitted through different PDU sessions for refined QoS guarantee and service continuity guarantee.

For example, the network node in the core network may set a correspondence between SSC mode, service differentiator, and service stream type identifier shown in Table 6 below according to the continuity requirement and the service stream type identifier of at least one media stream service sent by the 5GMS AF 1021 and the local network policy or configuration information. The information in the same row in Table 6 represents a set of association relationships.

TABLE 6

Correspondence between SSC mode, service differentiator, and service stream type identifier

| Service differentiator | Service stream type identifier | SSC mode |
| --- | --- | --- |
| SD1 | Media data | SSC mode 1 |
| SD1 | Usage reporting information | SSC mode 2 |
| SD2 | Index reporting information | SSC mode 3 |

In S403, the network node in the core network transmits the continuity feature of the at least one media stream service to the network node in the data network.

For example, the network node in the core network may feed back the association relationships in Table 6 to the 5GMS AF 1021.

Based on the method 400, the 5GMS AF 1021 may negotiate a continuity feature of at least one media stream service with the network node of the core network, so that the network side device may control the service continuity when transmitting media stream services according to service requirements. The 5GMS AF 1021 may negotiate a service differentiator of at least one media stream service with the network node of the core network, to realize finer QoS control of the media stream service.

By receiving the policy template with the SSC mode and/or service differentiator from the 5GMS AF 1021, the UE 101 may use, when initiating or changing a media stream service, a PDU session with the appropriate SSC mode to carry the media stream service. Therefore, the UE 101 may realize the continuity control of the media stream service when initiating or changing a media stream service.

In particular, the policy template may be used as the local configuration information of the UE. When the UE does not support the URSP rules, according to the information in the policy template, the media stream services are bound to a specific PDU session according to the local configuration, or whether to initiate a new PDU session is determined. In this way, the problem in the conventional technologies that a network side device cannot determine the service continuity of the service according to the requirements of the service provider.

An embodiment of the disclosure further provides a method for controlling transmission of a media stream service performed by a network node in a core network. The method includes: receiving the service differentiators of the media stream services from the network node in the data network; determining the service differentiators of the media stream services based on the service differentiators of the media stream services and the location configuration; and transmitting the service differentiators of the media stream services to the network node in the data network.

In an embodiment, the network node in the core network may further receive the service differentiators of the media stream services from the network node in the data network; determine the service differentiators of the media stream services based on the service differentiators of the media stream services and the location configuration; and transmit the service differentiators of the media stream services to the user terminal. For example, the service differentiator may be delivered from the PCF 1032 to the user terminal 101 through the URSP. The URSP generated at the PCF includes the service differentiator determined through negotiation of the 5GMS AF 1021 and the NEF/PCF.

An embodiment of the disclosure further provides a method for controlling transmission of a media stream service performed by a network node in a core network. The method includes: receiving the service stream type identifiers of the media stream services from the network node in the data network; determining the service differentiators of the media stream services based on the service stream type identifiers of the media stream services and the location configuration; and transmitting the service differentiators of the media stream services to the network node in the data network.

In an embodiment, the network node in the core network may further receive the service stream type identifiers of the media stream services from the network node in the data network; determine the service differentiators of the media stream services based on the service stream type identifiers of the media stream services and the location configuration; and transmit the service differentiators of the media stream services to the user terminal.

For example, the service differentiator may be delivered from the PCF 1032 to the user terminal 101 through the URSP. The URSP generated at the PCF includes the service differentiator determined through negotiation of the 5GMS AF 1021 and the NEF/PCF.

In an embodiment, the network node in the core network may further receive a service continuity requirement of at least one media stream service from the network node in the data network; determine a service continuity feature of the at least one media stream service based on the service continuity requirement of the at least one media stream service; and transmit the service continuity feature to the user terminal.

For example, the service continuity feature may be delivered from the PCF 1032 to the user terminal 101 through the URSP. For example, the service continuity feature is the SSC mode. The URSP generated at the PCF includes the SSC mode determined through negotiation of the 5GMS AF 1021 and the NEF/PCF.

Figure 5:
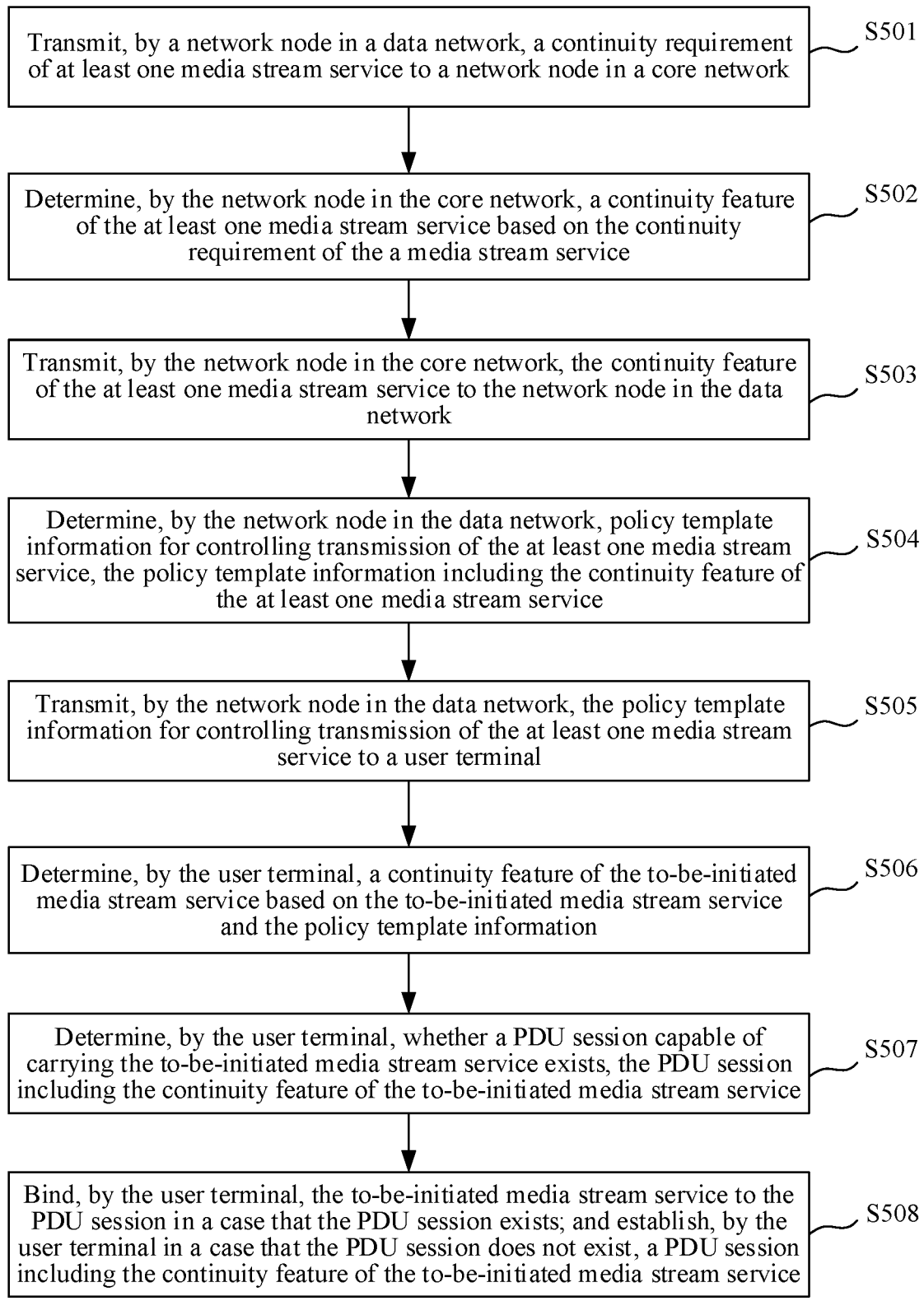
FIG. 5 is a flowchart of a method for controlling transmission of a media stream service according to an embodiment of the disclosure.

FIG. 5 is a flowchart of a method 500 for controlling transmission of a media stream service performed by a communication system shown in FIG. 1 according to an embodiment of the disclosure.

The various steps in the method 500 described in FIG. 5 may be performed by the UE 101, the 5GMS AF 1021, the NEF 1031, or the PCF 1032 (or a combination of the NEF 1031 and the PCF 1032) in FIG. 1 respectively. The NEF 1031, the PCF 1032, or a combination thereof may be alternatively referred to as a network node in the core network.

The method 500 includes S501-S508. In S501, a network node (for example, the 5GMS AF 1021) in the data network transmits a continuity requirement of at least one media stream service to a network node (for example, the NEF 1031, the PCF 1032, or a combination of the NEF 1031 and the PCF 1032) in the core network.

In an embodiment, the at least one media stream service corresponds to at least one media stream service type. Therefore, a network node (for example, the 5GMS AF 1021) in the data network may alternatively transmit a continuity requirement of a media stream service of at least one service type to a network node (for example, the NEF 1031, the PCF 1032, or a combination of the NEF 1031 and the PCF 1032) in the core network. Therefore, alternatively, a network node (for example, the 5GMS AF 1021) in the data network transmits a continuity requirement of at least one media stream service to a network node (for example, the NEF 1031, the PCF 1032, or a combination of the NEF 1031 and the PCF 1032) in the core network.

For example, the 5GMS AF 1021 may need to establish a media stream session with the UE 101 using the 5G media stream network for the transmission of services (for example, video conferencing). The media stream service has a specific continuity requirement, for example, requires that the IP address of the UE remains unchanged, to ensure the continuity of the media stream session service. Therefore, a network node carrying this part of the media stream service (for example, a network node in the core network, or the NEF and the PCF) of the 5G core network sets a corresponding service continuity feature (for example, an SSC mode) for this part of the service according to the requirements proposed by the 5GMS AF 1021, and may set a corresponding rate for the media stream service according to the set service continuity feature.

In an embodiment, the continuity requirement of at least one media stream service may be described in various manners. For example, the continuity requirement of at least one media stream service may be described in text: "this service requires the IP address of the UE to remain unchanged", or the like. The continuity requirement of at least one media stream service may be alternatively directly described by an indicator of the SSC mode (for example, if the SSC mode 1 is adopted, an indicator "1" may be directly used), which indicates that the media stream service requires a specific SSC mode. The form of the continuity requirement is not limited in the disclosure.

In S502, the network node in the core network determines a continuity feature of the at least one media stream service based on the continuity requirement of the media stream service.

For example, the SSC mode may be used to represent a session and service continuity of the media stream. A person skilled in the art would understand that other parameters may be alternatively used to represent the continuity feature of the media stream.

One media stream service may include service types of a plurality of media streams. For example, a video media stream session includes data transmission of upstream video media stream services, data transmission of downstream video media streams, control data transmission of upstream video media stream services, control data transmission of downstream video media streams, and the like. Service types of different media stream services may correspond to different service continuity features.

Since a network node in the core network may set different QoS for service streams of different media stream service types in at least one media stream service, different service types need to be distinguished.

In S503, a network node (for example, the NEF 1031, the PCF 1032, or a combination of the NEF 1031 and the PCF 1032) in the core network transmits a continuity feature of the at least one media stream service to a network node (for example, the 5GMS AF 1021) in the data network.

In S504, a network node (for example, the 5GMS AF 1021) in the data network determines policy template information for controlling transmission of the at least one media stream service, the policy template information including the continuity feature of the at least one media stream service.

The policy template information includes a set of parameters that are negotiated by network nodes in the CN 103 and the 5GMS AF 1011. The 5GMS AF 1011 may create, obtain, update, and delete related policy template resources in the process of negotiation with network nodes in the core network by creating a data model of the policy template. Therefore, the policy template information may also be referred to as policy templates, policy template resources, policy template resource information, policy template data, or the like. In the disclosure, the naming manner of the policy template information is used as an example, but the name of the policy template information is not limited.

In an embodiment, the policy template information further includes service differentiators, where the service differentiators are used for distinguishing media stream services of different service types in the at least one media stream service. The policy template information indicates a session policy of at least one media stream service type by associating the service differentiator with a policy in the policy template. In an embodiment, the policy template information indicates an attribute of a PDU session of at least one media stream service type by associating the service differentiator with an existing network feature.

For example, it is assumed that a piece of policy template information has a policy template identifier: policyTemplateId-1. The policy template information includes a service differentiator SD-1 and a continuity feature CF1 of the media stream service. Since the service differentiator SD-1 and the continuity feature CF1 of the media stream service are bot located in the policy template information of the policy template identifier policyTemplateId-1, the UE 101 may infer that the service differentiator SD-1 and the continuity feature CF1 of the media stream service are associated.

That is, the media stream service corresponding to the flow description identifier including the service differentiator SD-1 is to have the continuity feature CF1 of the media stream service.

Alternatively, the dynamic policy resource may further store the service differentiators and the policy template identifiers in the form of a key-value pair to establish an association relationship between the service differentiators and the policy template identifiers, and further determine the correlation between the service differentiators and the continuity features of the media stream services through the association relationship. For example, the flow description identifiers of the service differentiators are used as keys and the policy template identifiers are used as values to construct the following key-value pairs: <flow description identifier of service differentiator SD-1, policy template identifier policyTemplateId-1>, <flow description identifier of service differentiator SD-2, policy template identifier policyTemplateId-2>, <flow description identifier of service differentiator SD-3, policy template identifier policyTemplateId-3>, and the like. For example, a dynamic policy resource may further construct a key-value pair with a policy template identifier as a key and a flow description identifier of a service differentiator as a value. For example, a dynamic policy resource may further construct a key-value pair with a policy template identifier as a key and a service differentiator as a value. The manner of associating the service differentiators with the policy template identifiers is not further limited in the disclosure. In the embodiments of the disclosure, the SSC mode may be used to represent a session and service continuity of the media stream. A person skilled in the art would understand that other parameters may be alternatively used to represent the continuity feature of the media stream. Specifically, the SSC mode is associated with a protocol data unit (PDU) session and remains unchanged for the duration of the PDU session.

In S505, a network node (for example, the 5GMS AF 1021) in the data network transmits the policy template information for controlling transmission of the at least one media stream service to a user terminal (for example, the UE 101).

In S506, the user terminal (for example, the UE 101) determines, based on a media stream service and the policy template information, a continuity feature of the media stream service.

In S507, the user terminal (for example, the UE 101) determines whether a PDU session capable of carrying the media stream service exists, the PDU session including the continuity feature of the media stream service.

In S508, the user terminal binds the media stream service to the PDU session in a case that the PDU session exists; and the user terminal establishes, in a case that the PDU session does not exist, a PDU session including the continuity feature of the media stream service.

Since an SSC mode of a PDU session does not change during existence, in a case that a PDU session matching a continuity feature of a media stream service exists, the UE 101 may bind the media stream service to the PDU session, so that the PDU session may carry the media stream service. If there is no PDU session that matches the continuity feature of the media stream service, the UE 101 needs to establish a PDU session (that is, a PDU session with a specific SSC mode) that meets the continuity requirements of the media stream service.

In the method 500, by receiving a policy template with a continuity feature from a network side device, and the user terminal may use a PDU session with the appropriate continuity feature to carry the media stream service during movement. Therefore, the user terminal may realize the continuity control of the media stream service during movement. In this way, the problem in the conventional technologies that the network side device cannot configure the corresponding service continuity for a media stream service for the user terminal is solved.

In the method 500, the network node of the data network may negotiate a continuity feature of at least one media stream service with the network node of the core network, so that the network side device may control the service continuity when transmitting media stream services according to requirements of the service provider.

In the method 500, the network side device and the user terminal may further use service differentiators to identify subdivision types of a media stream service, and divide media stream services with the same service differentiator by using service stream type identifiers, to realize finer QoS control and service continuity control of the media stream service.

Figure 6:
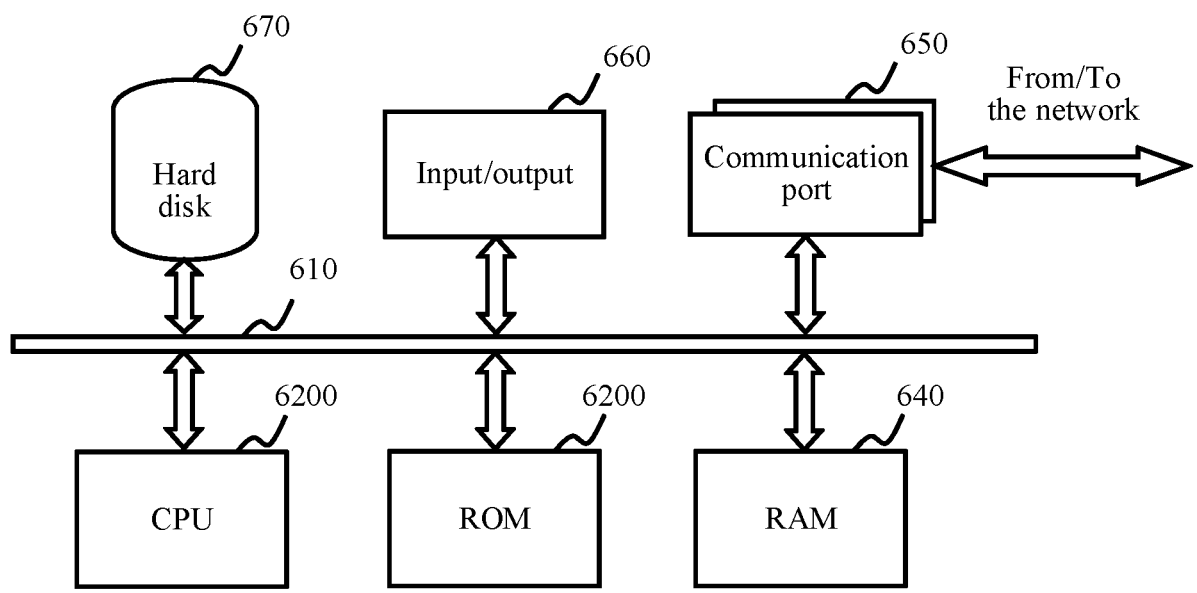
FIG. 6 shows an architecture of an electronic device according to an embodiment of the disclosure.

FIG. 6 shows an architecture of an electronic device 600 according to an embodiment of the disclosure.

The device (for example, the user terminal, the network node in the core network, or the network node in the data network) according to the embodiments of the disclosure may alternatively be implemented by using the architecture of the electronic device shown in FIG. 6. FIG. 6 shows an architecture of a computing device. As shown in FIG. 6, the computing device 600 may include a bus 610, one or more CPU 620, a read-only memory (ROM) 630, a random access memory (RAM) 640, a communication port 650 connected to a network, an input/output component 660, a hard disk 670, and the like. Storage devices, for example, the ROM 630 or the hard disk 660, in the computing device 600 may store various data or files used in processing and/or communication in a computer and program instructions executed by the CPU. The computing device 600 may further include a user interface 680. The architecture shown in FIG. 6 is only exemplary, and when different devices are implemented, one or more components in the computing device shown in FIG. 6 may be omitted according to an actual need.

The embodiments of the disclosure may be alternatively implemented as a non-volatile computer-readable storage medium. The non-volatile computer-readable storage medium according to the embodiments of the disclosure stores a computer-readable instruction. The computer-readable instruction, when executed by a processor, may perform the method according to the embodiments of the disclosure described with reference to the foregoing accompanying drawings. The non-volatile computer-readable storage medium includes, but is not limited to, a volatile memory and/or a non-volatile memory. For example, the volatile memory may include a RAM and/or a high-speed cache. For example, the non-volatile memory may include a ROM, a hard disk, or a flash memory.

The embodiments of the disclosure may be alternatively implemented as a computer program product or a computer program. The computer program product or the computer program includes computer instructions, and the computer instructions are stored in a non-volatile computer-readable storage medium. A processor of a computer device reads the computer instructions from the computer-readable storage medium, and executes the computer instructions, so that the computer device performs the method provided in the foregoing aspects or the optional implementations in the foregoing aspects.

A person skilled in the art would understand that, content disclosed in the disclosure may have various variations and improvements. For example, the devices or components described above may be implemented by using hardware, or may be implemented by using software, firmware, or a combination of some of or all of the software, the firmware, and the hardware.

In addition, as shown in the disclosure and the claims, words such as "a/an", "one", "one kind", and/or "the" do not refer specifically to singular forms and may also include plural forms, unless the context expressly indicates an exception. The "first", the "second", and similar terms used in the disclosure do not indicate any order, quantity or significance, but are used to only distinguish different components. Similarly, "include", "including", or similar terms mean that elements or items appearing before the term cover elements or items listed after the term and their equivalents, but do not exclude other elements or items. A similar term such as "connect" or "connection" is not limited to a physical or mechanical connection, but may include an electrical connection, whether direct or indirect.

In addition, flowcharts are used in the disclosure for illustrating operations performed by the system according to the embodiments of the disclosure. It is to be understood that, the foregoing or following operations are not necessarily strictly performed according to an order. On the contrary, the operations may be performed in a reverse order or simultaneously. Meanwhile, other operations may be added to the processes. Alternatively, one or more operations may be deleted from the processes.

Unless otherwise defined, all terms (including technical and scientific terms) used herein have the same meaning as commonly understood by one of ordinary skill in the art to which the present invention belongs. It is further to be understood that, the terms such as those defined in commonly used dictionaries are to be interpreted as having meanings that are consistent with the meanings in the context of the related art, and are not to be interpreted in an idealized or extremely formalized sense, unless expressively so defined herein.

In the embodiments of the disclosure, a policy template with a continuity feature is received from a network side device, and a user terminal may use, when initiating or changing a media stream service, a PDU session with the appropriate continuity feature to carry the media stream service. Therefore, the user terminal may realize the continuity control of the media stream service during movement. In this way, the problem in the conventional technologies that a mobile network side device cannot configure the corresponding service continuity for a media stream service of a specific type of the user terminal according to the actual service requirements is solved.

The disclosure is described in detail above, but for a person skilled in the art, it is obvious that the disclosure is not limited to the implementations described in this specification. The disclosure may be implemented in a modification and change manner without departing from the spirit and scope of the disclosure determined by a record of the claims. Therefore, the description in this specification is for the purpose of illustration and does not have any restrictive meaning for the disclosure.

What is claimed is:

1. A method for controlling transmission of a media stream service, comprising:
   receiving, from a network node in a data network, policy template information for controlling transmission of at least one media stream service, the at least one media stream service comprising a media stream service of at least one service type, the policy template information comprising a continuity feature of the at least one media stream service;
   receiving, from the network node in the data network, at least one service differentiator corresponding to the policy template information, media stream services of different service types in the at least one media stream service being distinguishable from each other based on the at least one service differentiator;
   determining a service differentiator corresponding to the media stream service of a service type in the at least one media stream service based on the at least one service differentiator corresponding to the policy template information;
   determining, based on the media stream service of the at least one media stream service and the policy template information, a continuity feature of the media stream service;
   determining, using the service differentiator, subdivision types of the at least one media stream service, and grouping media stream services with the same service differentiator by using service stream type identifiers;
   determining whether a protocol data unit (PDU) session capable of carrying the media stream service exists, the PDU session comprising the continuity feature of the media stream service;
   binding, based on the service differentiator, the media stream service to the PDU session based on a determination that the PDU session exists; and
   establishing, based on a determination that the PDU session does not exist, a PDU session comprising the continuity feature of the media stream service.

2. The method according to claim 1, wherein the continuity feature of the at least one media stream service is a session and service continuity (SSC) mode, and the SSC mode is transmitted from the network node in the data network to a user terminal with the policy template information in a form of an asset of a policy template resource.

3. The method according to claim 1, wherein the continuity feature of the at least one media stream service is a session and service continuity (SSC) mode, and the SSC mode is transmitted from the network node in the data network to a user terminal with the policy template information in a form of a parameter in application session context in a policy template resource.

4. The method according to claim 1, wherein the binding, based on the service differentiator, of the media stream service to the PDU session, includes binding the media stream service of the service type to a quality of service (QoS) stream corresponding to the service differentiator in the PDU session.

5. The method according to claim 1, wherein the media stream service of which the transmission is controlled includes at least one of text, audio, or video.

6. An electronic device, comprising:

at least one memory configured to store program code; and at least one processor configured to read the program code and operate as instructed by the program code, the program code including:

first receiving code configured to cause the at least one processor to receive, from a first network node in a data network, policy template information for controlling transmission of at least one media stream service, the at least one media stream service comprising a media stream service of at least one service type, the policy template information comprising a continuity feature of the at least one media stream service;

second receiving code configured to cause the at least one processor to receive, from the network node in the data network, at least one service differentiator corresponding to the policy template information, media stream services of different service types in the at least one media stream service being distinguishable from each other based on the at least one service differentiator;

service differentiator determining code configured to cause the at least one processor to determine a service differentiator corresponding to the media stream service of a service type in the at least one media stream service based on the at least one service differentiator corresponding to the policy template information;

continuity feature determining code configured to cause the at least one processor to determine, based on the media stream service of the at least one media stream service and the policy template information, a continuity feature of the media stream service;

first determining code configured to cause the at least one processor to determine, using the service differentiator, subdivision types of the at least one media stream service, and grouping media stream services with the same service differentiator by using service stream type identifiers;

second determining code configured to cause the at least one processor to determine whether a protocol data unit (PDU) session capable of carrying the media stream service exists, the PDU session comprising the continuity feature of the media stream service;

first binding code configured to cause the at least one processor to bind, based on the service differentiator, the media stream service to the PDU session based on a determination that the PDU session exists; and establishing code configured to cause the at least one processor to establish, based on a determination that the PDU session does not exist, a PDU session comprising the continuity feature of the media stream service.

7. The electronic device according to claim 6, wherein the continuity feature of the at least one media stream service is a session and service continuity (SSC) mode, and the SSC mode is transmitted from the first network node in the data network to a user terminal with the policy template information in a form of an asset of a policy template resource.

8. The electronic device according to claim 6, wherein the continuity feature of the at least one media stream service is a session and service continuity (SSC) mode, and the SSC mode is transmitted from the first network node in the data network to a user terminal with the policy template information in a form of a parameter in application session context in a policy template resource.

9. The electronic device according to claim 6, wherein the first binding code is configured to cause the at least one processor to, based on the service differentiator, bind the media stream service of the service type to a quality of service (QoS) stream corresponding to the service differentiator in the PDU session.

* * * * *